(12) United States Patent
Rubenbauer et al.

(10) Patent No.: US 8,515,643 B2
(45) Date of Patent: Aug. 20, 2013

(54) METHOD FOR CONTROLLING A SOLENOID VALVE

(75) Inventors: Michael Rubenbauer, Wuerzburg (DE); Kostyantyn Lolenko, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 431 days.

(21) Appl. No.: 12/735,239

(22) PCT Filed: Nov. 14, 2008

(86) PCT No.: PCT/EP2008/065513
§ 371 (c)(1),
(2), (4) Date: Sep. 23, 2010

(87) PCT Pub. No.: WO2009/086975
PCT Pub. Date: Jul. 16, 2009

(65) Prior Publication Data
US 2011/0010067 A1    Jan. 13, 2011

(30) Foreign Application Priority Data

Jan. 10, 2008    (DE) .......................... 10 2008 003 798

(51) Int. Cl.
*B60T 8/17* (2006.01)

(52) U.S. Cl.
USPC .......................................... 701/70; 700/282

(58) Field of Classification Search
USPC ................. 701/70, 71, 78, 82; 73/54.01, 121, 73/39, 54.06, 54.14, 61.47, 64.46; 303/113.1, 303/113.4, 114.1, 115.4, 116.1, 146, 155, 303/125; 340/453; 700/282; 903/947; 123/198 F, 90.16, 90.5, 90.55, 90.39, 90.56
See application file for complete search history.

(56) References Cited

U.S. PATENT DOCUMENTS

| | | | | |
|---|---|---|---|---|
| 5,631,623 A * | 5/1997 | Yoshimura | .................... | 338/142 |
| 5,636,910 A | 6/1997 | Kost et al. | | |
| 5,641,209 A * | 6/1997 | Kushi et al. | .................. | 303/9.71 |
| 5,767,397 A * | 6/1998 | Eisele | ............................ | 73/121 |
| 5,779,327 A * | 7/1998 | Nakashima et al. | ...... | 303/122.12 |
| 2001/0038243 A1* | 11/2001 | Isono | ......................... | 303/116.1 |
| 2005/0134110 A1* | 6/2005 | Reuter et al. | ................ | 303/114.1 |

FOREIGN PATENT DOCUMENTS

| | | |
|---|---|---|
| DE | 37 31 076 | 3/1989 |
| DE | 199 61 293 | 6/2000 |
| DE | 10 2006 022 806 | 11/2007 |
| EP | 0 779 631 | 6/1997 |
| JP | 3-500276 | 1/1991 |
| JP | 8-34336 | 2/1996 |
| JP | 9-162031 | 6/1997 |
| JP | 2002-533263 | 10/2002 |
| JP | 2002-539030 | 11/2002 |
| WO | WO 00/55021 | 9/2000 |
| WO | WO 2007/131898 | 11/2007 |

\* cited by examiner

*Primary Examiner* — Marthe Marc-Coleman
(74) *Attorney, Agent, or Firm* — Kenyon & Kenyon LLP

(57) ABSTRACT

In a method for controlling a proportional solenoid valve in a hydraulic system, a model of the hydraulic system is formed, control cycles are predefined, and an estimate is made of the pressure prevailing in the hydraulic system at the end of the control cycle and of the coil current applied to the coil of the solenoid valve based on the variables prevailing at the start of the control cycle, the physical parameters of components of the hydraulic system, and the temperature of the hydraulic fluid.

14 Claims, 5 Drawing Sheets

METHOD FOR CONTROLLING A SOLENOID VALVE

BACKGROUND OF THE INVENTION

1. Field of the Invention

The present invention relates to a method for controlling a solenoid valve, e.g., a proportional solenoid valve, which is used for controlling the pressure in a hydraulic system, such as ABS (antilock braking system) and/or ESP (anti-slip regulation) in a motor vehicle.

2. Description of Related Art

In implementation of vehicle dynamics control systems such as ABS, ESP, ASR (electronic stability program) and the like, a proportional solenoid valve is used for a targeted build-up of pressure or reduction in pressure in the hydraulic system. The hydraulic system may include, for example, a hydraulic brake circuit, a hydraulically operable clutch in an automatic transmission, hydraulic actuators for influencing driving dynamics or the like. Known controllers of a proportional solenoid valve for ABS/ESP systems assume either a strict steady-state behavior of the proportional solenoid valve (dp method), a strict switching behavior (quasi-switching method) or a linear valve behavior (LMV method). The choice of the method to be used depends on the stipulated pressure gradient. In estimating the pressure in the brake cylinder, in the known approaches it is always assumed that the setpoint pressure is reached accurately at the end of the actuation of the proportional solenoid valve, inasmuch as this is implementable within the scope of physical limits.

Due to the variety of different methods, unambiguous switchover conditions between the different methods must be defined. Therefore, valve triggering, pressure estimation and the calibration procedure are very complex. Important influencing parameters, such as the inductance of the coil of the proportional solenoid valve, the nonlinear relationship between the valve flow rate and the coil current, or the pressure difference are not taken into account in any of the aforementioned known triggering methods. Likewise, the dynamic response and the nonlinearity of the proportional solenoid valve are not taken into account in the pressure estimate, which results in errors in estimation of the brake pressure and must be taken into account heuristically by introducing additional terms.

BRIEF SUMMARY OF THE INVENTION

An object of the present invention is to provide an improved method for controlling a solenoid valve, in particular a proportional solenoid valve, which does not have the above-mentioned disadvantages of the known methods.

The present invention provides forming a model of the hydraulic system, by predefining control cycles and by estimating the pressure prevailing in the hydraulic system at the end of the control cycle and the coil voltage applied to the coil of the solenoid valve on the basis of the variables prevailing at the start of the control cycle, the physical parameters of components of the hydraulic system, and the temperature of the hydraulic fluid.

The method for controlling a solenoid valve according to the present invention permits an improvement in the accuracy of the pressure estimate and pressure setting and thus an increase in the robustness of the hydraulic system. The model-based method proposed according to the present invention allows parameterization of the control and the pressure estimate based on the physical parameters of the components of the hydraulic system, such as in particular the proportional solenoid valve and the brake caliper of an ABS/ESP system for motor vehicles. The method of pressure estimation and control may be adapted comparatively rapidly and inexpensively to different valve and hydraulic systems in this way, resulting in a definite reduction in the calibration effort. In addition, the proposed control method is simpler than known approaches, thereby simplifying system maintenance, among other things. The tuning parameters provided in this method advantageously allow an influence on the control dynamics of the brake pressure and/or noise output associated with control of the valve.

The coil voltage is determined from the setpoint pressure and the instantaneous brake pressure, the pressure in the main brake cylinder, the temperature of the brake fluid and the physical valve and brake caliper parameters. The value of the pressure in the brake cylinder at the end of each triggering cycle time is estimated accurately. The basis for the triggering and the pressure estimate forms a dynamic system model, which represents the dynamic and nonlinear performance of the valve. In determining the control voltage and the pressure estimate, the physical system parameters and the ambient conditions, the temperature of the hydraulic fluid and the pressure in the brake caliper and the main brake cylinder are taken into account. The control and pressure estimate have a modular design. Therefore, it is readily possible to adapt this method to various types of valves and brake systems.

The valve triggering outlined here may also be used in a pressure regulation in the form of a precontrol.

The accuracy in pressure adjustment and pressure estimation is increased by the method according to the present invention. Furthermore, an improvement in the robustness performance (taking into account ambient conditions) is achieved. In addition, because the physical system parameters are taken into account in the triggering and in the brake pressure estimate, a reduction in their complexity and thus a simplification of the calibration are achieved. This method is suitable for a variety of hydraulic systems, for implementation of the driver's intent, e.g., also for hydraulic X-by-wire actuators in the area of steering and braking of a motor vehicle.

The parameters and engine characteristics maps of the model on which the control and pressure estimate are based may be identified by measuring components and used in the control and pressure setting. To solve the problem defined in the introduction, a control unit for a hydraulic system capable of executing the proposed method is required. The method may be stored as a program in a memory-programmable ABS/ESP controller, for example, or implemented in hardware.

DETAILED DESCRIPTION OF THE INVENTION

Figure 1:
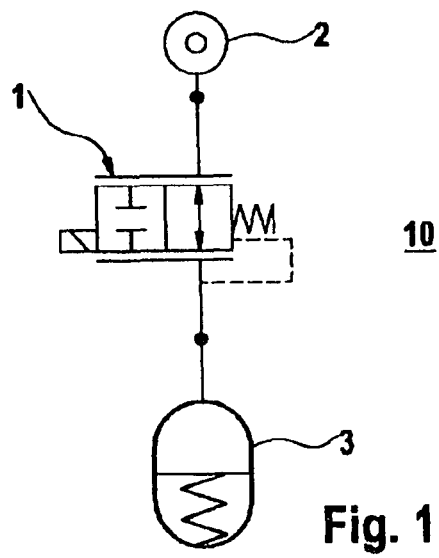
FIG. 1 shows the components of the controlled system for the pressure build-up.

The present invention is explained below using the example of an ABS/ESP system for a motor vehicle, assuming a digital implementation having a fixed sampling time (cycle time). In a schematic and simplified diagram, FIG. 1 shows the essential components of the controlled system for the pressure build-up, including a proportional solenoid valve 1 as the control member, a main brake cylinder 2 as the pressure source and a brake caliper 3 as the accumulator. A dynamic model is used to calculate the coil voltage on proportional solenoid valve 1.

Model of the System

The control and estimation problem is first formulated below and then the calculation path for the coil voltage and the brake pressure is presented with the help of the model, on which the method according to the present invention is based. The equation system of the model for proportional solenoid valve 1 includes a differential equation for the coil having an inductance L and an ohmic resistance R:

$$\frac{dI}{dt} = \frac{1}{L}(U - R \cdot I) \quad (1)$$

Where
L=inductance of the coil
R=ohmic resistance of the coil
I=coil current
dI/dt=change in coil current over time.

In addition, the equation system includes an equation for the flow rate of hydraulic fluid as a function of the pressure difference across proportional solenoid valve 1, the coil current, and the temperature of the hydraulic fluid for the hydromechanics of proportional solenoid valve 1:

$$Q = f_1(I, p\_mc - p\_calip, T\_Fluid), \quad (2)$$

Where
Q=flow rate
P_mc-p_calip=pressure difference across the proportional solenoid valve
I=coil current
T_Fluid=temperature of the hydraulic fluid.

Finally, the equation system includes a differential equation for the brake caliper pressure, which is a function of a hydraulic elasticity of brake caliper 3:

$$\frac{dp\_calip}{dt} = E(p\_calip, T\_Fluid) \cdot Q, \quad (3)$$

Where
p_calip=brake caliper pressure
E=hydraulic elasticity of the brake caliper
Q=flow rate
T_Fluid=temperature of the hydraulic fluid.

The Control Problem

Figure 2:
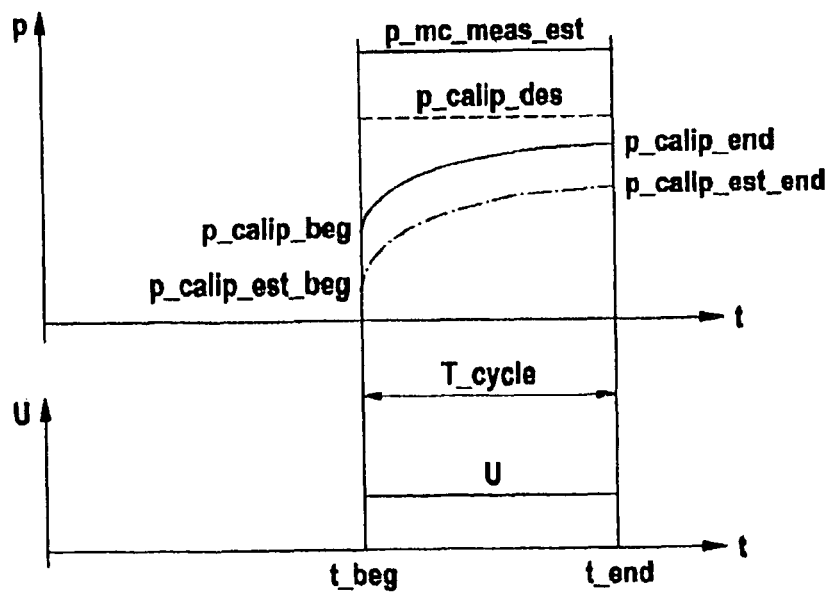
FIG. 2 shows a diagram of the setpoint pressure, the actual pressure, and the estimated pressure in valve operation as a function of time.

FIG. 2 shows a diagram of voltage U across proportional solenoid valve 1 and pressure p in the hydraulic system as a function of time t, the diagram illustrating the setpoint pressure, the actual pressure, and the estimated pressure when the valve is actuated.

A control cycle is designated as T_cycle, beginning at t_beg and ending at t_end. Voltage U, which is to be applied to the coil of proportional solenoid valve 1 during a control cycle T_cycle (FIG. 2), is calculated from setpoint brake pressure p_calip_des, estimated pressure p_calip_est_beg at the start of the control cycle, measured or estimated pressure p_mc_meas_est of the main brake cylinder, estimated temperature T_Fluid_est of the hydraulic fluid and the system parameters of the model on which the method is based, using the following equation:

$$U = f_1(p\_calip\_des, p\_calip\_est\_beg, p\_mc\_meas\_est, T\_Fluid\_est, parameters) \quad (4)$$

Where
U=voltage on the proportional solenoid valve
P_calip_des=setpoint brake pressure
P_calip_est_beg=estimated pressure in the brake cylinder at the start of the control cycle
P_mc_meas_est=measured and/or estimated pressure of the main brake cylinder
T_Fluid_est=estimated temperature of the hydraulic fluid
Parameters=system parameters.

The estimated brake pressure at the end of control cycle T_cycle must be calculated from the coil voltage, the estimated pressure at the start of the control cycle, the measured or estimated pressure of the main brake cylinder, the estimated temperature of the hydraulic fluid and the system parameters according to the following equation:

$$p\_calip\_est\_end = f_2(U, p\_mc\_meas\_est, p\_calip\_est\_beg, T\_Fluid\_est, parameters) \quad (5)$$

where
P_calip_est_end=estimated brake pressure at the end of the control cycle,
T_cycle=control cycle,
U=coil voltage,
P_calip_est_beg=estimated pressure at the start of the control cycle,
P_mc_meas_est=pressure on the main brake cylinder,
T_Fluid_est=estimated temperature of the hydraulic fluid,
parameters=system parameters.

Ascertaining the Control Voltage

In each control cycle T_cycle, an assessment is performed with the aid of the conditions given below, ascertaining whether it is expedient to maintain the brake pressure (pressure-holding phase):

$$(p\_calip\_des - p\_calip\_est) < \Delta p\_min \quad (6)$$

or to build up the brake pressure (pressure build-up phase)

$$(p\_calip\_des - p\_calip\_est) \geq \Delta p\_min. \quad (7)$$

In this control method, it is additionally provided to predefine minimal threshold U_min and maximal threshold U_max of coil voltage U. If voltage U_incr calculated in the pressure build-up phase is greater than U_max, then there is a change to the pressure-holding phase. If voltage U_incr calculated in the pressure build-up phase is lower than minimal voltage U_min, then minimal value U_min is selected as the coil voltage.

Figure 3:
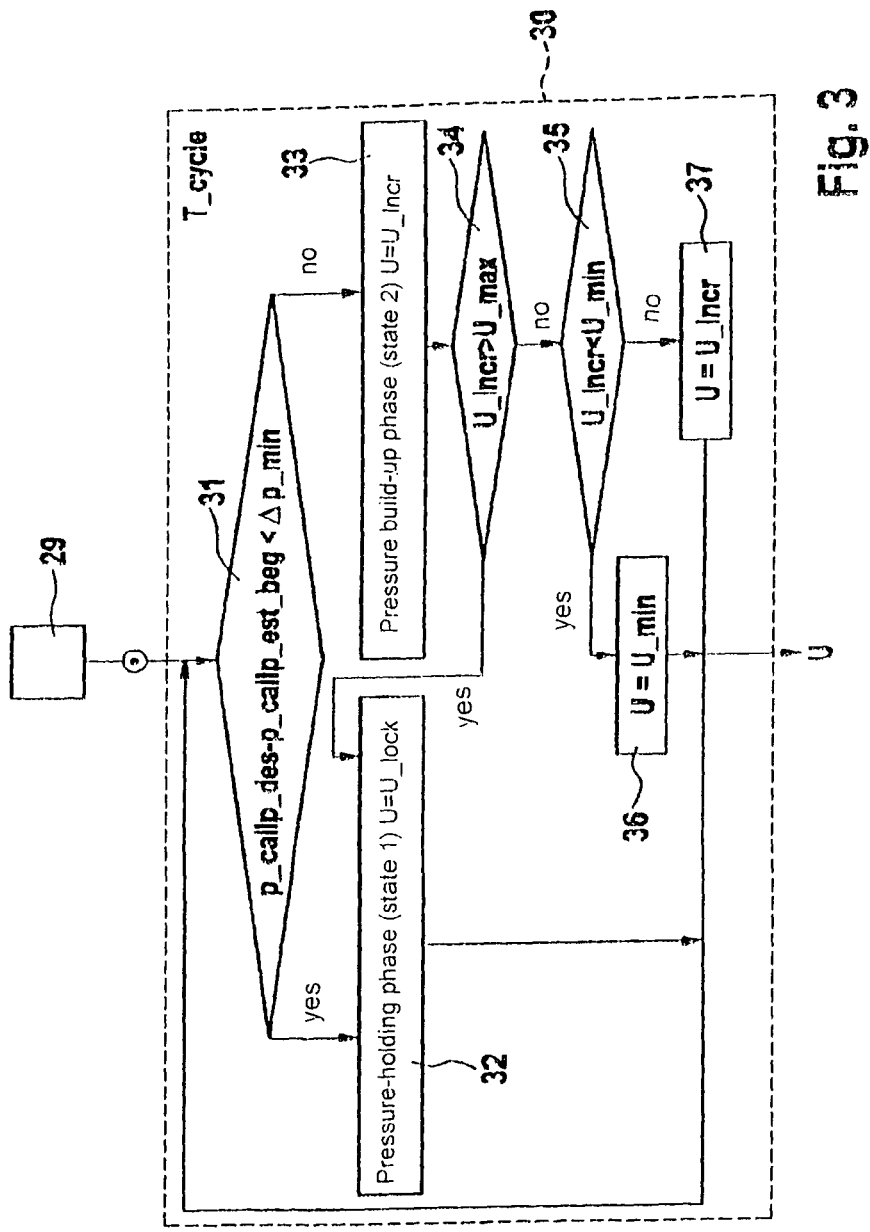
FIG. 3 shows a flow chart to illustrate the choice between the pressure build-up phase and the pressure holding phase.

The choice of minimal pressure increment Δp_min, minimal voltage U_min and maximal voltage threshold U_max has an influence on the dynamics, the noise and the robustness of the controller of proportional solenoid valve 1. Calculation of the control voltage is explained in greater detail below with reference to the flow chart in FIG. 3. Step 29 activates a function module 30, in which the steps described below are performed. In step 31 there is a check on whether pressure difference (p_calip_des-p_calip_est) is greater than/equal to or less than the pressure value of minimal pressure increment Δp_min. If this pressure is less than the pressure value of the minimal pressure increment, the process switches to step 32, in which a coil voltage U having a value of U_lock is supplied for control of proportional solenoid valve 1. The pressure-holding phase is initiated in this way.

Alternatively, if this pressure difference is greater than the pressure value of the minimal pressure increment, there is a switch to step 33, in which the coil voltage is raised to a value of U_incr for the purpose of building up a higher pressure (pressure build-up phase). In step 34, there is a check on whether voltage U_incr is greater than a maximal threshold value U_max. If this is the case, the sequence branches off to step 32, and the pressure-holding phase is initiated. If this is not the case, the sequence branches off to step 35. A check is performed in step 35 to ascertain whether or not voltage U_incr is less than minimal threshold U_min. If the voltage is less than minimal threshold U_min, the sequence branches off to step 36, and the coil voltage is set at a value of U=U_min before initiating the pressure-holding phase. If the check in step 35 reveals that voltage U_incr is greater than minimal threshold U_min, then in step 37, voltage value U_incr is accepted for control of proportional solenoid valve 1 and initiation of the pressure-holding phase. Thus, in the pressure-holding phase, a coil voltage U_lock is applied, allowing secure closing of proportional solenoid valve 1 and thereby holding of the pressure in brake caliper 3. The voltage is determined from estimated coil resistance R_est, a pressure difference (p_mc_meas_est−p_calip_est_beg) between the estimated or measured pressure in the main brake cylinder and the estimated initial brake pressure. Additional pressure difference Δp_secure ensures secure pressure holding with any changes that might occur during driver operation and/or measurement errors and/or estimation errors in the brake pressure during a control cycle. To also be able to close the valve reliably, even with the possible valve tolerances, a "worst case" valve characteristics map $f_{wcase}^{-1}(\ldots)$, which represents the performance of a limit-case valve, may be used in the calculation of U_lock.

The coil system is calculated by inversion of equation (2) according to the pressure difference (p_mc_meas_est−p_calip_est_beg) for Q=0. In addition, a limitation of the current to a value I_max is also predefined, to be able to prevent a thermal overload on the valve, if necessary:

$$I\_lock = \min[f_{wcase}^{-1}(p\_mc\_meas\_est - p\_calip\_est\_beg + \Delta p\_secure, Q=0, T\_Fluid), I\_max] \quad (8)$$

Where
I_lock=holding current
p_mc_meas_est=measured or estimated pressure in the main brake cylinder
p_calip_est_beg=estimated pressure in the brake caliper at the start of the control cycle
Δp_secure=additional pressure difference to secure the closed state of the valve in the pressuring-holding phase
Q=0=no flow
T_Fluid=temperature of the hydraulic fluid.

The applied coil voltage is calculated from holding current I_lock calculated with equation (8) and estimated coil resistance R_est as follows:

$$U\_lock = (R\_est + \Delta R) \cdot I\_lock. \quad (9)$$

With parameter ΔR, the maximum error which may occur in underestimating resistance R is taken into account in equation (9). This ensures that the coil current will have at least a value I_lock.

Function $f_{wcase}^{-1}(\ldots)$ may be stored as a 2D table or, disregarding the dependence on temperature T_Fluid of the hydraulic fluid, as a 1D table in a control unit. Alternatively, the engine characteristics map may be approximated with an analytical function, so the memory demand and possibly also the computation complexity may be reduced.

The Pressure Build-Up Phase

Figure 4:
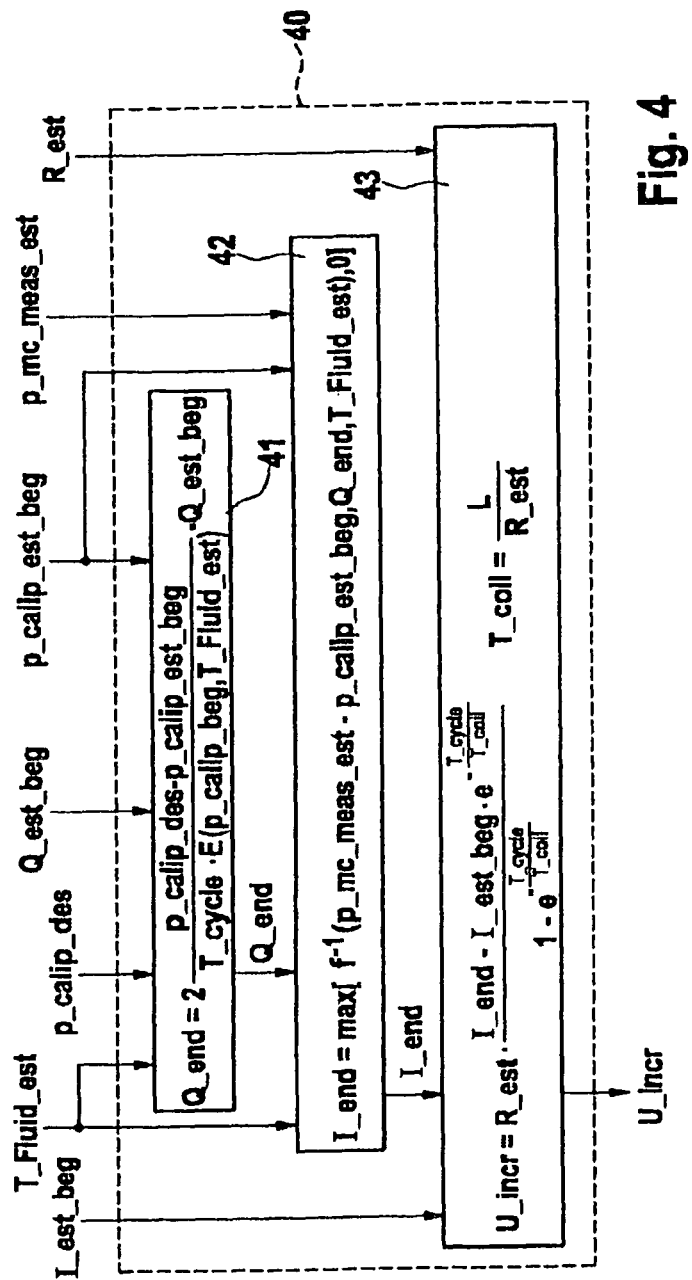
FIG. 4 shows a flow chart for calculating the coil voltage of the proportional solenoid valve.

The pressure build-up phase is described further below, including a reference to the flow chart in FIG. 4. The sequences described below take place in function module 40. By algebraic inversion of the equation system using equations (1), (2), (3), required coil voltage U_incr is determined from the setpoint specification for brake pressure p_calip_des, estimated initial pressure p_calip_est_beg in the brake cylinder, estimated or measured pressure p_mc_meas_est in the main brake cylinder, estimated coil resistance R_est, estimated temperature T_Fluid of the hydraulic fluid and the system parameters.

In a first step, by integrating the model equation (1), flow rate Q is calculated according to the following equation, assuming a linear flow model:

$$Q = Q\_est\_beg + \frac{Q\_end - Q\_est\_beg}{T\_cycle} t \quad (10)$$

and during control cycle T_cycle, required flow rate Q_end (step 41 in FIG. 4) at the end of control cycle time T_cycle is calculated to reach setpoint brake pressure p_calip_des:

$$Q\_end = 2 \frac{p\_calip\_des - p\_calip\_est\_beg}{T\_cycle \cdot E(p\_calip\_est\_beg, T\_Fluid\_est)} - Q\_est\_beg \quad (11)$$

Next, by inversion of equation (2), the coil current at the end of the control cycle is calculated and limited to the value zero (step 42 in FIG. 4):

$$I\_end = \max[f^{-1}(p\_mc\_meas\_est - p\_calip\_est\_beg, Q\_end, T\_Fluid\_est), Q=0] \quad (12)$$

Finally, by solving the differential equation (3), voltage U_incr, which is to be applied during the control cycle (step 43 in FIG. 4), is calculated:

$$U\_incr = R\_est \frac{I\_end - I\_est\_beg \cdot e^{\frac{T\_cycle}{T\_coil}}}{1 - e^{\frac{T\_cycle}{T\_coil}}} \quad (13)$$

Coil time constant T_coil is calculated from inductance L and estimated resistance R_est of the coil of proportional solenoid valve 1 using the following equation:

$$T\_coil = \frac{L}{R\_est} \quad (14)$$

In the case of a proportional solenoid valve having a current regulator, instead of the coil voltage, a setpoint current is predefined. This is formed from holding current I_lock and end current I_end during the pressure build-up phase.

As a simplification, the relationship $f'(\ldots)$ may be approximated with the help of an analytical function. Alternatively, it may be stored as an engine characteristics map in a memory device and used further. Electric coil time constant T_coil from equation (12) may also be approximated as a constant parameter. The exponential relationship $$e^{\frac{T\_cycle}{T\_coil}}$$

in equation (13) may either be approximated as a linear relationship or, assuming a constant coil time constant T_coil, considered to be a constant parameter.

Figure 5:
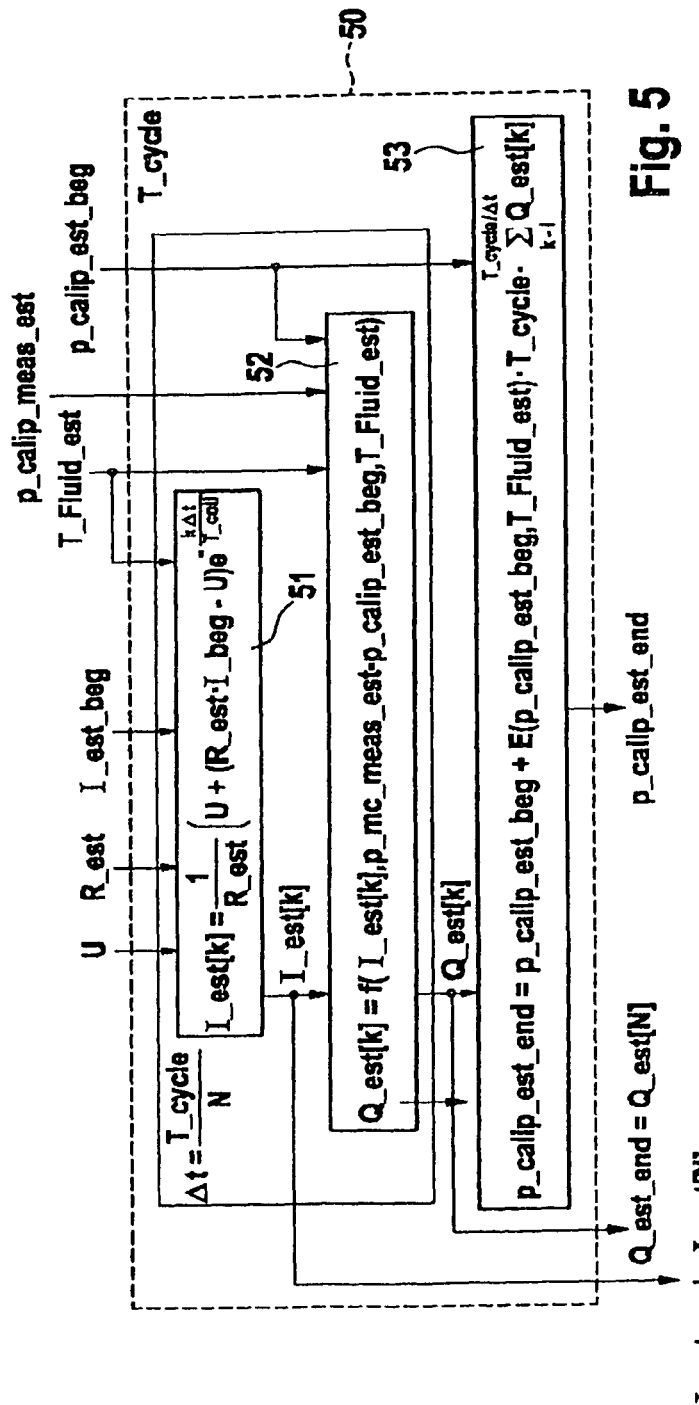
FIG. 5 shows a flow chart for calculating the estimated brake caliper pressure at the end of the control cycle.

The method of ascertaining the pressure in brake caliper 3 is described below with reference to the flow chart in FIG. 5. The sequences described below take place in function module 50. Estimated brake caliper pressure p_calip_est_end at the end of a control cycle T_cycle is calculated from coil voltage U, estimated pressure p_calip_est_beg at the start of the control cycle, measured or estimated pressure p_mc_meas_est of the main brake cylinder, estimated temperature T_Fluid_est of the hydraulic fluid and the system parameters.

Control cycle T_cycle is divided into N sections of duration Δt to achieve a more accurate assessment of the current and flow rate estimates and thus also a more accurate estimate of the pressure. The current is calculated for each section according to the following equation (step 51 in FIG. 5):

$$I\_est[k] = \frac{1}{R\_est}\left(U + (R\_est \cdot I\_beg - U)e^{-\frac{k\Delta t}{T\_coil}}\right), \quad (15)$$

where k=1, ... N.

Next (step 52 in FIG. 5) flow rate Q_est is calculated according to the following equation:

$$Q\_est[k] = f(I\_est[k], p\_mc\_meas\_est - p\_calip\_est\_beg, T\_Fluid\_est) \quad (16)$$

Finally, based on this, the estimated brake pressure at the end of the cycle time is calculated according to the following equation (step 53 in FIG. 5):

$$p\_calip\_est\_end = p\_calip\_est\_beg + \quad (17)$$
$$E(p\_calip\_est\_beg, T\_Fluid\_est) \cdot T\_cycle \cdot \sum_{k=1}^{T\_cycle/\Delta t} Q\_est[k]$$

In an advantageous embodiment variant, functional relationship f( ... ) in equation (16) may be approximated by an analytical function or stored as a characteristics map and used further. Electric coil constant T_coil may in turn be approximated using a constant parameter. Exponential relationship $$e^{\frac{T\_cycle}{T\_coil}}$$

may either be approximated as a linear relationship or considered to be a constant parameter assuming a constant coil time constant T_coil.

Figure 6:
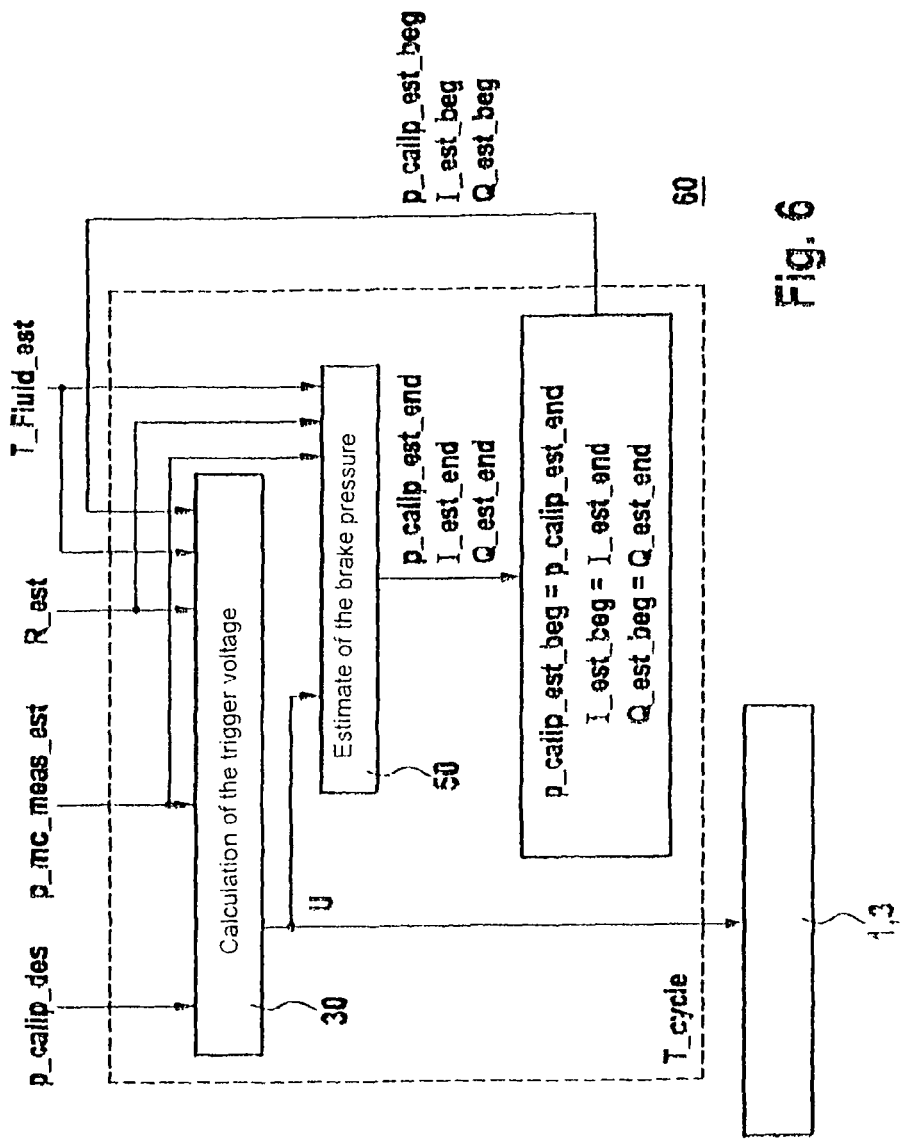
FIG. 6 shows a block diagram to illustrate the interfaces.

Block diagram 60 in FIG. 6 illustrates the interfaces again.

What is claimed is:

1. A method for controlling a proportional solenoid valve in a hydraulic system, comprising:
   forming a model of the hydraulic system having a predefined control cycle; and
   estimating using a programmable controller (i) a pressure prevailing in the hydraulic system at the end of the control cycle and (ii) a coil voltage applied to the coil of the proportional solenoid valve, on the basis of selected variables prevailing at the start of the control cycle, selected physical parameters of components of the hydraulic system, and temperature of a hydraulic fluid,
   wherein the hydraulic system is an ABS/ESP (antilock braking system/electronic stability program) system of a motor vehicle, and wherein physical parameters of the proportional solenoid valve and of a brake caliper are taken into account in the estimating,
   wherein a linear flow rate of the hydraulic fluid is assumed during duration of the control cycle,
   wherein the following equations are used as the basis of the model:

$$\frac{dI}{dt} = \frac{1}{L}(U - R \cdot I), \text{ where}$$

L=inductance of the coil;
R=ohmic resistance of the coil;
I=coil current;
dI/dt=change in coil current over time;
   Q=f_1(I, p_mc−p_calip, T_Fluid), where
Q=flow rate;
P_mc−p_calip=pressure difference across the proportional solenoid valve;
I=coil current;
T_Fluid=temperature of the hydraulic fluid;

$$\frac{dp\_calip}{dt} = E(p\_calip, T\_Fluid) \cdot Q, \text{ where}$$

p_calip=brake caliper pressure;
E=hydraulic elasticity of the brake caliper;
Q=flow rate; and
T_Fluid=temperature of the hydraulic fluid.

2. The method as recited in claim 1, wherein the control cycle is divided into N time intervals, and wherein the flow rate in each time interval of the N time intervals is calculated for estimation of the pressure prevailing in the hydraulic system at the end of the control cycle.

3. The method as recited in claim 1, wherein the elasticity of the brake caliper, the relationship between the flow rate and the coil current, the pressure difference applied to the proportional solenoid valve and the inductance of the coil of the proportional solenoid valve are taken into account for estimating the pressure prevailing in the hydraulic system at the end of the control cycle and the coil voltage applied to the coil of the proportional solenoid valve.

4. The method as recited in claim 1, wherein the voltage across the proportional solenoid valve is ascertained according to the following equation:
   U=f_1(p_calip_des, p_calip_est_beg, p_mc_meas_est, T_Fluid_est, Parameters), where
   U=voltage across the proportional solenoid valve,
   P_calip_des=setpoint brake pressure,
   P_calip_est_beg=estimated pressure at the start of the control cycle,
   P_mc_meas_est=estimated pressure of the main brake cylinder,
   T_Fluid_est=estimated temperature of the hydraulic fluid, and
   Parameters=system parameters.

5. The method as recited in claim 1, wherein an estimated brake pressure at the end of the control cycle is ascertained according to the following equation:

$$P\_calip\_est\_end = f_2(U, p\_mc\_meas\_est, p\_calip\_est\_beg, T\_Fluid\_est, Parameters),$$

where
P_calip_est_end=estimated brake pressure at the end of the control cycle,
U=coil voltage,
P_calip_est_beg=estimated pressure at the start of the control cycle,
P_mc_meas_est=pressure in the main brake cylinder,
T_Fluid_est=estimated temperature of the hydraulic fluid,
Parameters=system parameters.

6. The method as recited in claim 5, wherein the estimated brake pressure p_calip_est_end at the end of the control cycle is ascertained according to the following equation:

$$p\_calip\_est\_end = p\_calip\_est\_beg + E(p\_calip\_est\_beg, T\_Fluid\_est) \cdot T\_cycle \cdot \sum_{k=1}^{T\_cycle/\Delta t} Q\_est[k].$$

7. The method as recited in claim 1, wherein in the control cycle one of a pressure-holding phase or a pressure build-up phase is executed, the pressure-holding phase being executed when the following equation is satisfied:

$$(p\_calip\_des - p\_calip\_est) < \Delta p\_min,$$

and the pressure build-up phase being executed when the following equation is satisfied:

$$(p\_calip\_des - p\_calip\_est) \geq \Delta p\_min, \text{ where}$$

Δp_min=predefined minimal pressure increment,
P_calip_des=setpoint pressure in the brake caliper,
P_calip_est=estimated pressure in the brake caliper.

8. The method as recited in claim 7, wherein a minimal threshold voltage and a maximal threshold voltage are predefined for the coil voltage.

9. The method as recited in claim 8, wherein if the coil voltage across the proportional solenoid valve as calculated in the pressure build-up phase is greater than the maximal threshold voltage, then a change in the pressure-holding phase occurs.

10. The method as recited in claim 8, wherein if the voltage across the proportional solenoid valve as calculated in the pressure build-up phase is lower than the minimal threshold voltage, then the minimal threshold voltage is selected as the coil voltage.

11. The method as recited in claim 10, wherein the voltage $U_{13}$ incr to be applied to the proportional solenoid valve during a control cycle T_cycle is ascertained according to the following equation:

$$U\_incr = R\_est \frac{I\_end - I\_est\_beg \cdot e^{\frac{T\_cycle}{T\_coil}}}{1 - e^{-\frac{T\_cycle}{T\_coil}}}$$

where $$T\_coil = \frac{L}{R\_est}$$

and
R_est=estimated resistance of the coil of the proportional solenoid valve,
I_end=required coil current at the end of the control cycle,
I_est_beg=estimated current at the start of the control cycle.

12. The method as recited in claim 11, wherein estimated coil current $I_{13}$ est is ascertained according to the following equation in each interval of time (N) of the control cycle T_cycle:

$$I\_est[k] = \frac{1}{R\_est}(U + (R\_est \cdot I\_beg - U)e^{-\frac{k\Delta t}{T\_coil}}),$$

where
k=1, ... N and
I_est=estimated coil current,
R_est=estimated coil resistance,
U=coil voltage,
I_beg=coil current at the start of the control cycle, and $$T\_coil = \frac{L}{R\_est}.$$

13. The method as recited in claim 7, wherein a locking coil voltage is applied to the proportional solenoid valve in the pressure-holding phase to enable secure closing of the proportional solenoid valve and holding of the pressure in the brake caliper.

14. The method as recited in claim 13, wherein the locking coil voltage is determined from an estimated coil resistance and a pressure difference between an estimated pressure in the main brake cylinder and an estimated initial brake pressure.

* * * * *

UNITED STATES PATENT AND TRADEMARK OFFICE
CERTIFICATE OF CORRECTION

PATENT NO.        : 8,515,643 B2                                                          Page 1 of 1
APPLICATION NO. : 12/735239
DATED             : August 20, 2013
INVENTOR(S)       : Rubenbauer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 503 days.

Signed and Sealed this
Fifteenth Day of September, 2015

Michelle K. Lee
*Director of the United States Patent and Trademark Office*